(12) United States Patent
Chu

(10) Patent No.: US 11,002,320 B2
(45) Date of Patent: May 11, 2021

(54) CLUTCH DEVICE FOR COMPRESSOR

(71) Applicant: Henry C. Chu, Orange, CA (US)

(72) Inventor: Henry C. Chu, Orange, CA (US)

( * ) Notice: Subject to any disclaimer, the term of this patent is extended or adjusted under 35 U.S.C. 154(b) by 92 days.

(21) Appl. No.: 16/246,584

(22) Filed: Jan. 14, 2019

(65) Prior Publication Data
US 2020/0224731 A1   Jul. 16, 2020

(51) Int. Cl.
*F16D 1/076* (2006.01)
*F16D 13/70* (2006.01)
*F16H 55/36* (2006.01)

(52) U.S. Cl.
CPC ............. *F16D 13/70* (2013.01); *F16D 1/076* (2013.01); *F16H 55/36* (2013.01)

(58) Field of Classification Search
CPC ........... F16D 13/70; F16D 1/076; F16H 55/36
See application file for complete search history.

(56) References Cited

U.S. PATENT DOCUMENTS

| | | | |
|---|---|---|---|
| 4,860,867 A * | 8/1989 | Nishimura | F16D 27/112 192/84.941 |
| 5,642,798 A | 7/1997 | Muirhead et al. | |
| 7,037,201 B2 | 5/2006 | McCoy et al. | |
| 7,293,965 B2 | 11/2007 | Tabuchi et al. | |
| 8,517,698 B2 | 8/2013 | Cochran | |
| 8,978,856 B2 | 3/2015 | Cochran et al. | |

* cited by examiner

*Primary Examiner* — Huan Le
(74) *Attorney, Agent, or Firm* — Browdy and Neimark, PLLC

(57) ABSTRACT

A compressor includes a housing, a drive shaft rotatably engaged in the housing, a stator attached to the housing, a pulley rotatably attached to the housing and rotatable relative to the housing, a front plate attached to the drive shaft and rotated in concert with the drive shaft, and a lock device includes a lock member attached to the drive shaft and rotated in concert with the drive shaft, and the lock member is secured to the front plate for anchoring and securing the front plate and the lock member and the drive shaft together. The drive shaft includes a non-circular section, and the lock member includes a non-circular bore engaged with the drive shaft for preventing the lock member from being rotated relative to the drive shaft.

6 Claims, 7 Drawing Sheets

CLUTCH DEVICE FOR COMPRESSOR

BACKGROUND OF THE INVENTION

1. Field of the Invention

The present invention relates to a clutch device for compressor, and more particularly to a clutch device for a compressor of a refrigeration system including an improved and simplified structure or configuration for suitably and solidly and stably anchoring or retaining or securing the front plate and the pulley to the compressor drive shaft and for preventing the front plate from being disengaged or separated from the pulley and the compressor drive shaft inadvertently.

2. Description of the Prior Art

Typical refrigerating systems, such as the automotive air conditioning systems comprise a refrigerant circuit having a condenser, an evaporator, and a wobble plate type or slant plate type compressor with a variable displacement mechanism, in which the compressor of the aforesaid general kind normally comprises a clutch device for transmitting drive from the drive means to the compressor element when compression is required. The clutch is normally held in engagement by a spring device and is disengagable by a device responsive to a pressure resulting from the compressor output to interrupt the drive to the compressor element when said pressure reaches a predetermined value. The clutch device normally includes a pulley and a front plate attached or mounted or secured to a compressor drive shaft for transmitting drive from the drive means to the compressor element when compression is required.

Almost all automotive air conditioning clutches are powered by a belt driven pulley, a pulley that freely rotates about the drive shaft of the compressor until an annular iron armature is pulled, by an electromagnetic coil, against a friction disk of the pulley with enough force to cause the two to stick frictionally together. The armature, in turn, is physically supported on a central hub of the compressor drive shaft by an armature support mechanism that holds the armature coaxially to and spaced away from the pulley friction disk, close enough to be pulled into and against it when the clutch is actuated.

When the clutch device is not engaged, the compressor drive shaft does not rotate and refrigerant does not circulate the rotor pulley free wheels. A field coil is selected from an electromagnet, once the field coil is energized, it draws the pressure plate toward it, locking the rotor pulley and the pressure plate together causing the compressor internals to turn, creating pressure and circulating the refrigerant.

For example, U.S. Pat. No. 5,642,798 to Muirhead et al., U.S. Pat. No. 7,037,201 to McCoy et al., U.S. Pat. No. 7,293,965 to Tabuchi et al., U.S. Pat. No. 8,517,698 to Cochran, and U.S. Pat. No. 8,978,856 to Cochran et al. disclose several of the typical air compressors each also comprising a clutch device for transmitting drive from the drive means to the compressor element when compression is required, and the clutch includes a pulley and a front plate attached or mounted or secured to a compressor drive shaft for allowing the drive shaft of the compressor to be selectively rotated or driven by a belt with the pulley.

The front plate of the clutch device of the typical compressor is normally attached or mounted or secured to the compressor drive shaft with such as a threaded engagement. However, the front plate may be solidly anchored or retained or secured to the drive shaft when the pulley is rotated or driven by the belt in an active direction, but the front plate may have a good chance to be disengaged from the drive shaft inadvertently when the pulley is rotated or driven by the belt in an opposite direction, The present invention has arisen to mitigate and/or obviate the afore-described disadvantages of the conventional clutch devices for compressors.

SUMMARY OF THE INVENTION

The primary objective of the present invention is to provide a clutch device for compressor including an improved and simplified structure or configuration for suitably and solidly and stably anchoring or retaining or securing the front plate and the pulley to the compressor drive shaft and for preventing the front plate from being disengaged or separated from the pulley and the compressor drive shaft inadvertently.

In accordance with one aspect of the invention, there is provided a clutch device for a compressor, the compressor comprising a housing, a drive shaft rotatably engaged in the housing, a stator attached to the housing, a pulley rotatably attached to the housing and rotatable relative to the housing, a front plate attached to the drive shaft and rotated in concert with the drive shaft, and a lock device including a lock member attached to the drive shaft and rotated in concert with the drive shaft, and the lock member being secured to the front plate for anchoring and securing the front plate and the lock member and the drive shaft together, and for preventing the front plate from being disengaged or separated from the pulley and the compressor drive shaft inadvertently.

The drive shaft includes a non-circular section formed and provided thereon, and the lock member includes a non-circular bore formed in the lock member and engaged with the non-circular section of the drive shaft for anchoring the lock member to the drive shaft and for preventing the lock member from being pivoted or rotated relative to the drive shaft. The non-circular bore of the lock member is selected from a hexagonal bore or other non-circular cross sections.

The drive shaft includes a threaded section, and the front plate includes a screw hole formed in the front plate and engaged with the threaded section of the drive shaft for detachably attaching and securing the front plate to the drive shaft. The lock member includes a hub extended from the lock member for reinforcing the lock member.

The lock device includes at least one fastener engaged with the lock member and the front plate for solidly member to the front plate and for preventing the lock member from being rotated relative to the front plate and for preventing the lock member from being disengaged from the front plate inadvertently.

The lock member includes at least one groove formed in the lock member for slidably and adjustably engaging with the fastener and for allowing the lock member to be adjusted relative to the front plate before the fastener secures and locks the lock member to the front plate.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
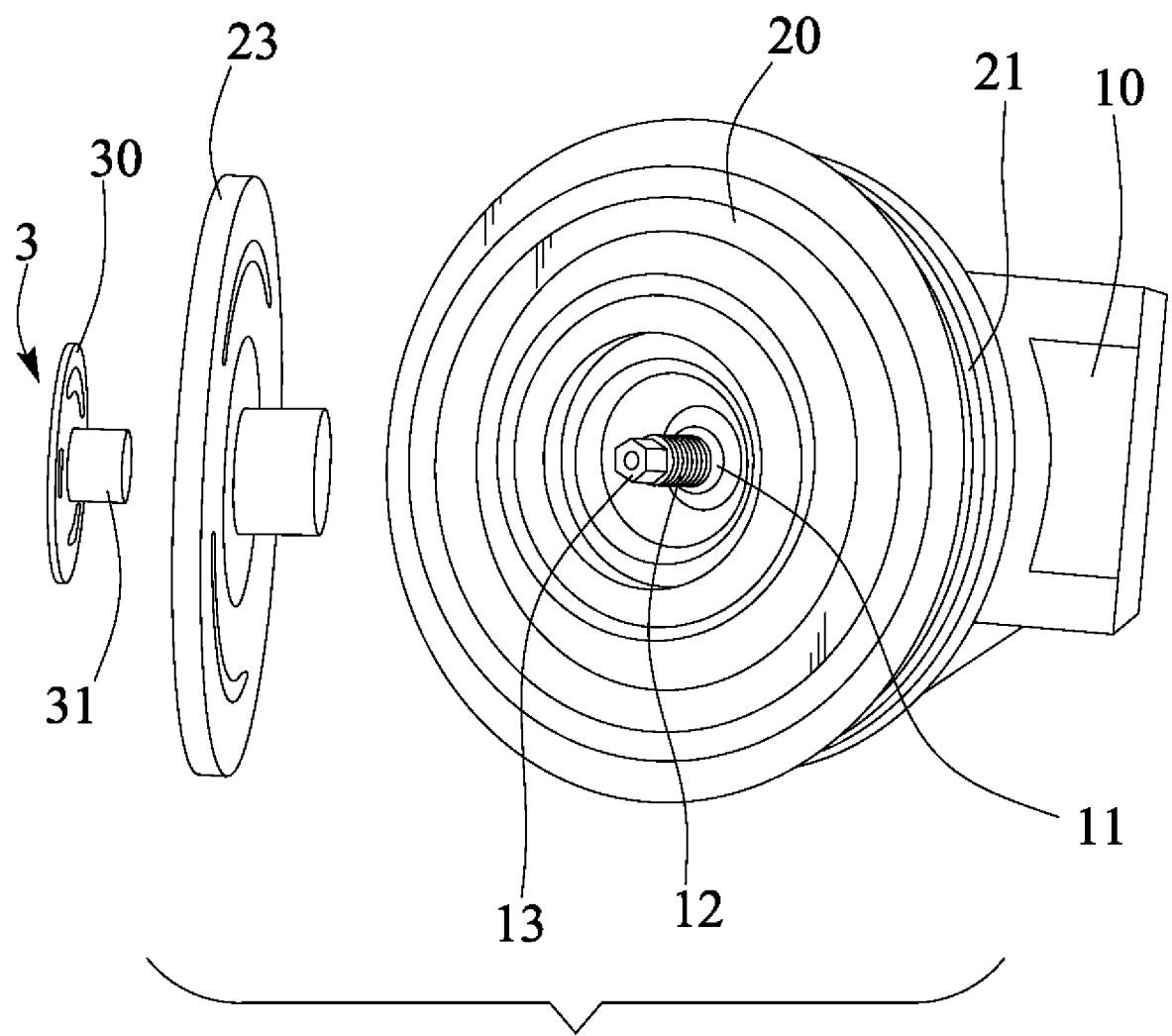
FIG. 1 is a partial exploded view of a compressor having a clutch device in accordance with the present invention.
Figure 2:
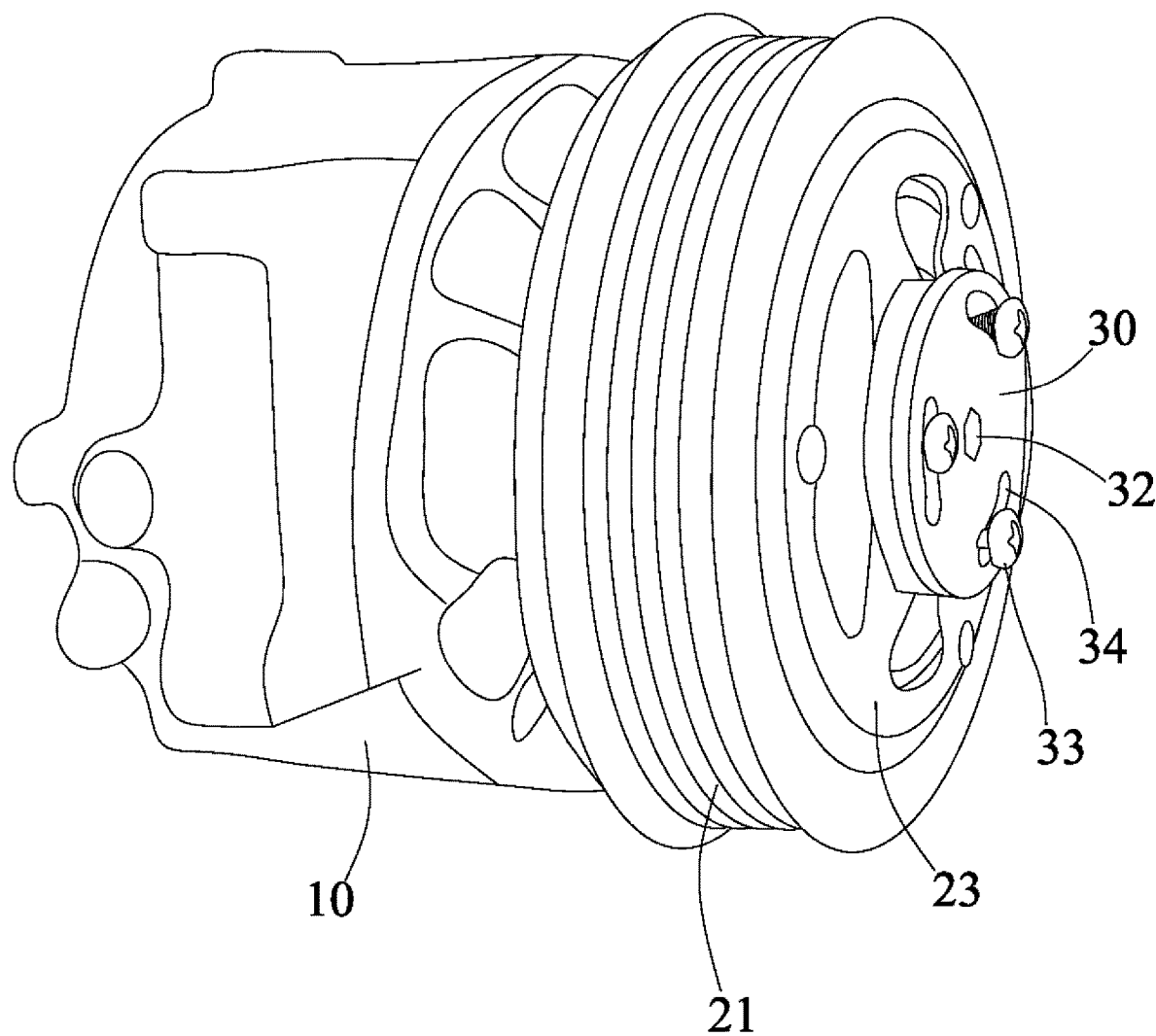
FIG. 2 is a perspective view illustrating the compressor with the clutch device.
Figure 4:
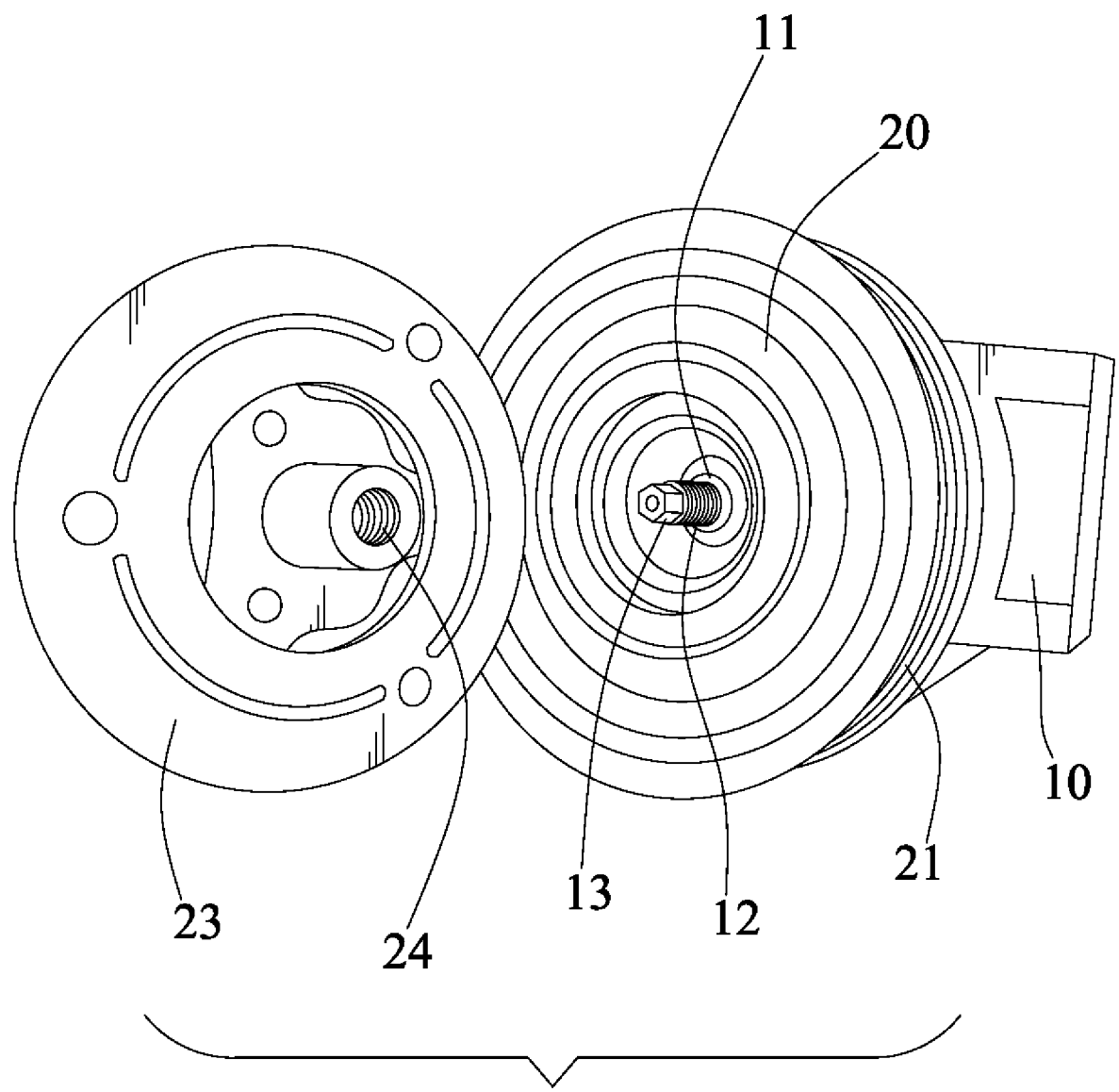
FIG. 4 is a partial exploded view illustrating a front plate for attaching or mounting to the compressor drive shaft of the compressor.
Figure 5:
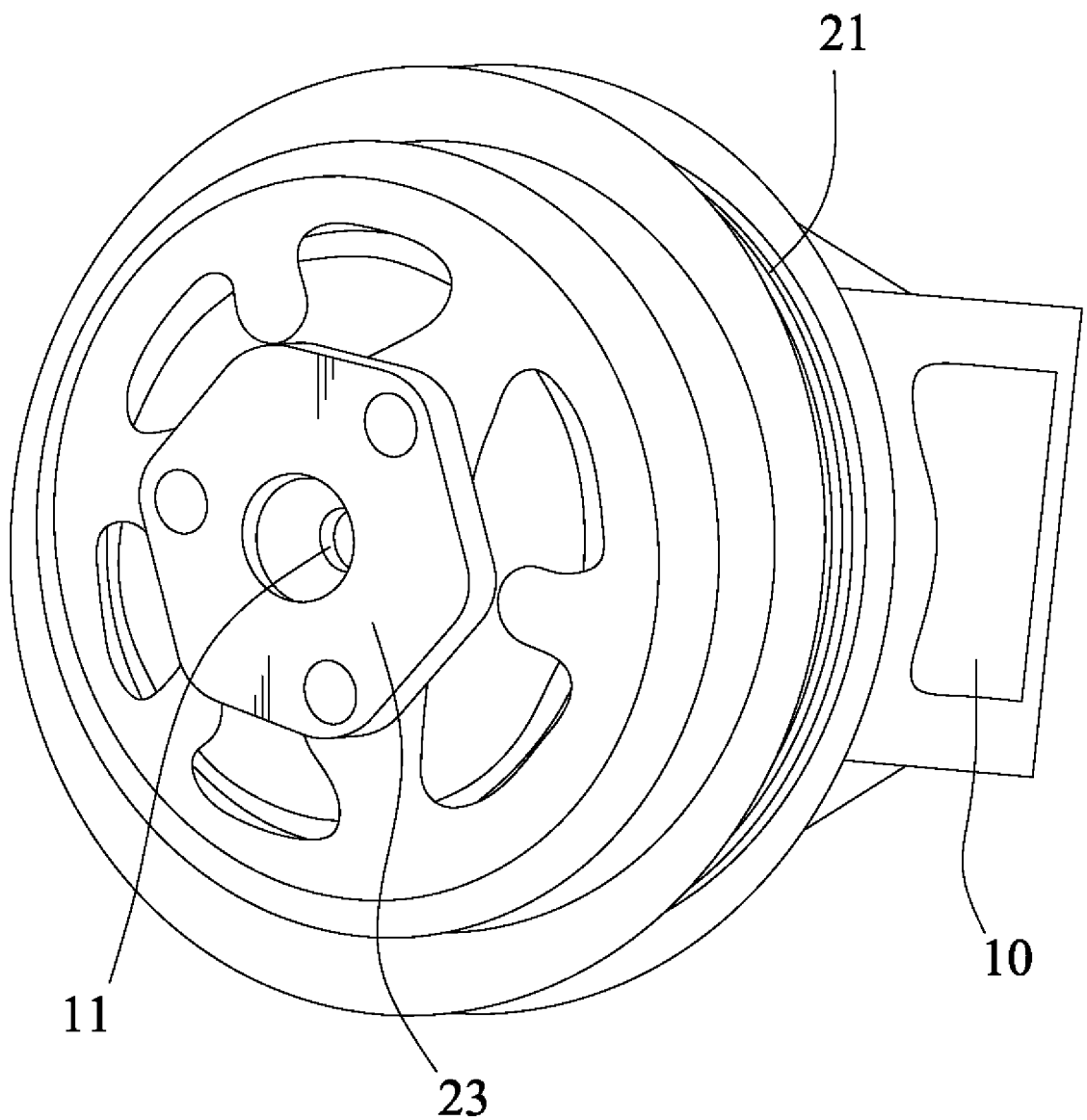
FIG. 5 is a partial perspective view illustrating the engagement or attachment of the front plate to the compressor drive shaft of the compressor.

Referring to the drawings, and initially to FIGS. 1 and 2, a compressor in accordance with the present invention comprises an outer receptacle or housing 10, and a compressor drive shaft 11 rotatably received or engaged in the housing 10, and the drive shaft 11 includes a threaded segment or section 12 and a non-circular segment or section 13 having such as a hexagonal or other cross section (FIG. 1) formed and provided on the outer or free end portion of the drive shaft 11. A coil or stator 20 is attached or mounted or secured to the housing 10, and a pulley 21 is rotatably attached or mounted or secured to the housing 10, such as rotatably engaged onto the stator 20 and rotatable relative to the stator 20 and the housing 10. A pressure plate or front plate 23 includes a threaded hole or screw hole 24 formed or provided therein (FIG. 4) for threading or engaging with the threaded section 12 of the drive shaft 11 and for allowing the front plate 23 to be detachably or changeably attached or mounted or secured to the drive shaft 11 (FIGS. 4, 5), and for allowing the front plate 23 to be rotated in concert with the drive shaft 11.

Figure 3:
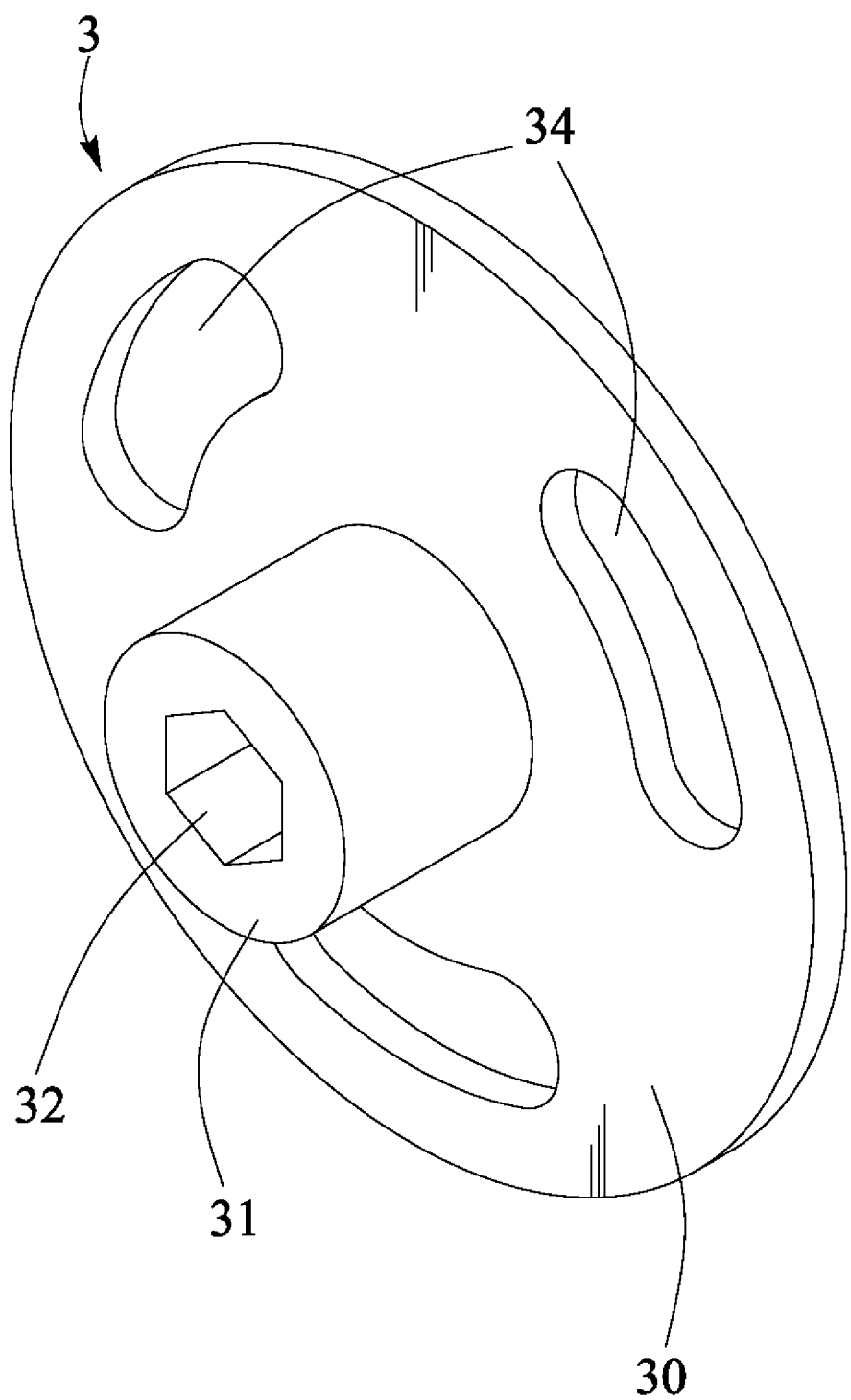
FIG. 3 is a perspective view of a lock member of a lock device in accordance with the present invention.
Figure 6:
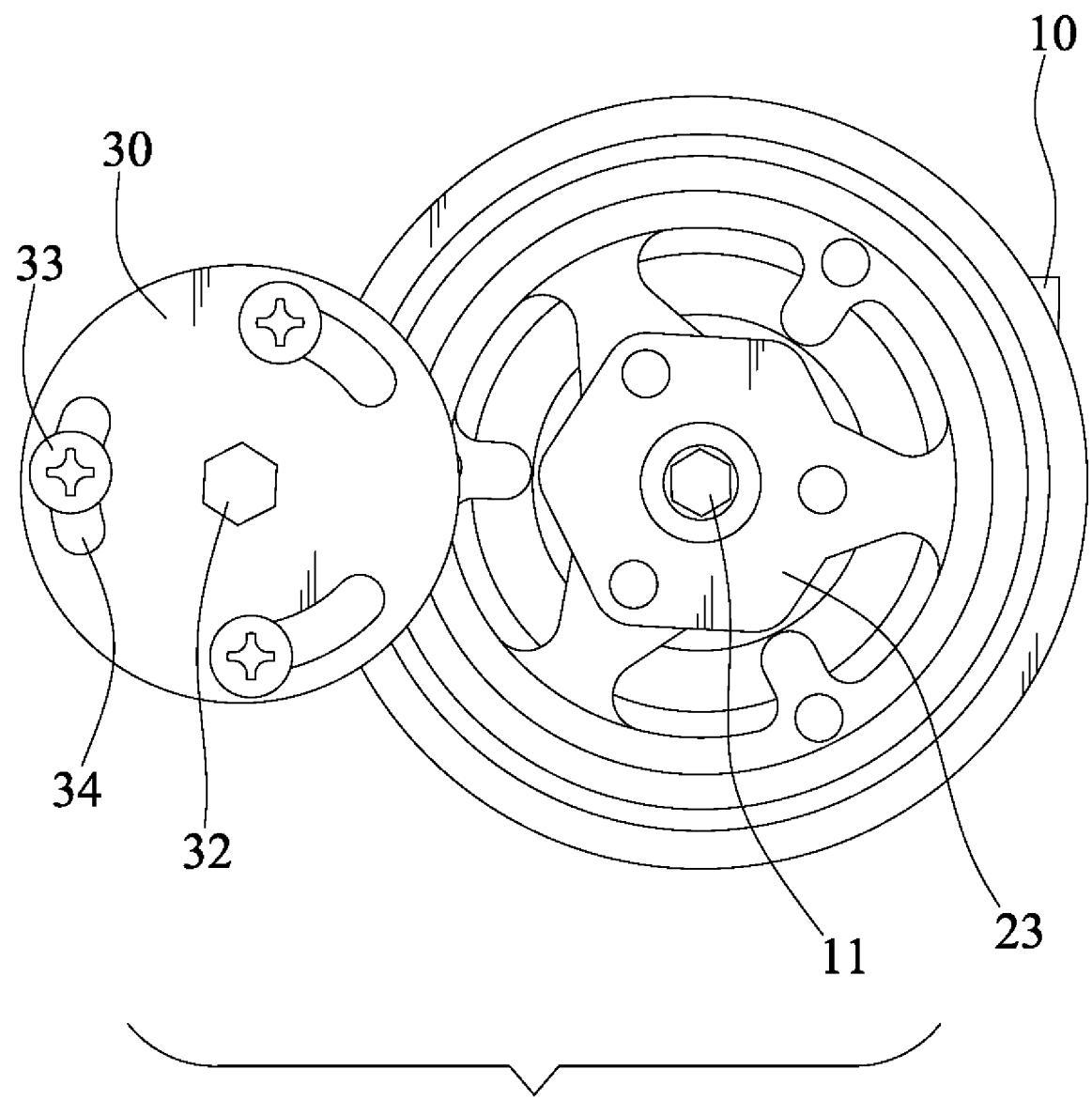
FIG. 6 is another partial exploded view illustrating a lock member of a lock device for attaching or securing the front plate to the compressor drive shaft of the compressor.
Figure 7:
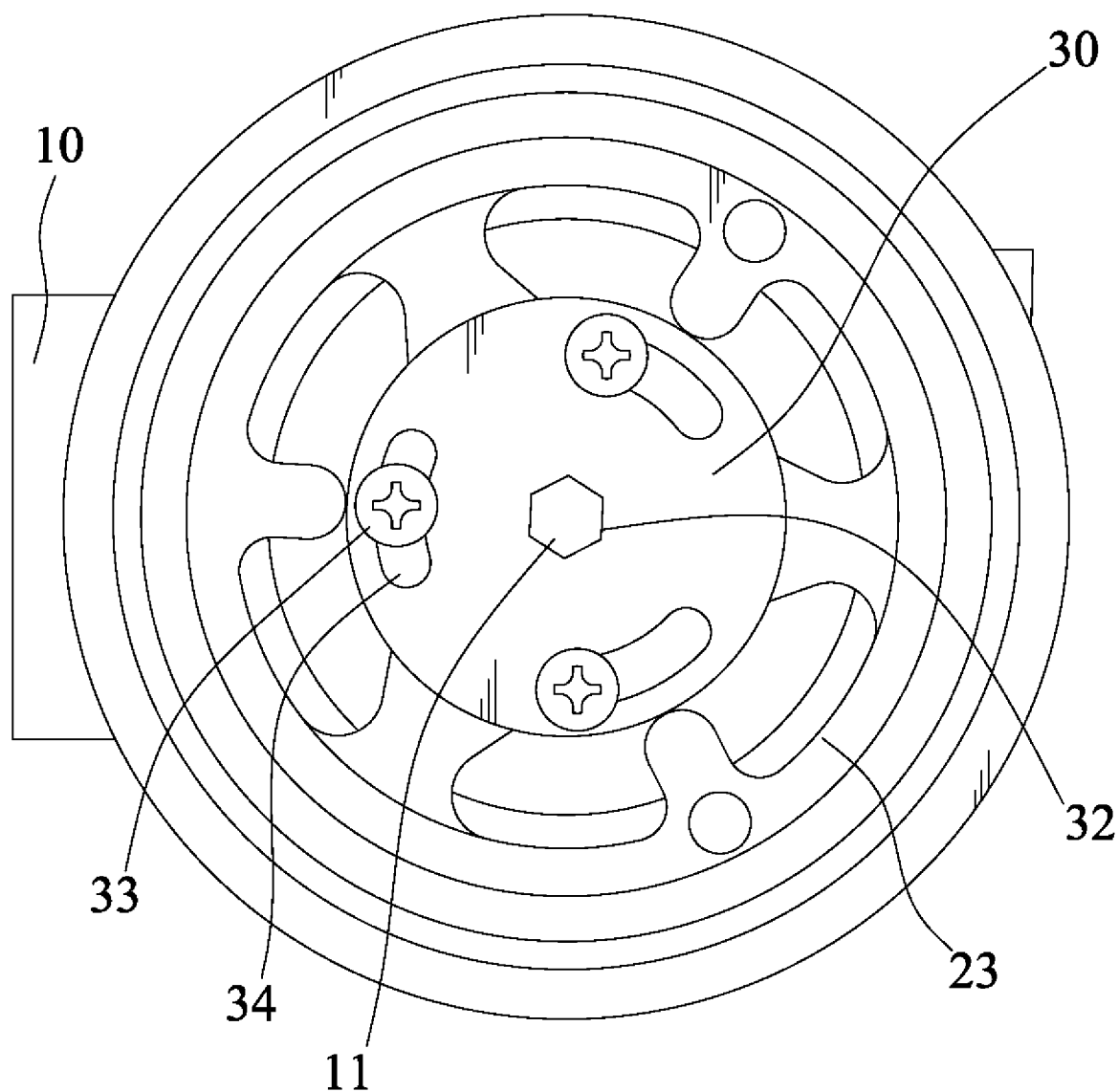
FIG. 7 is another partial perspective view illustrating the engagement or attachment of the lock member of the lock device to the front plate.

The compressor in accordance with the present invention further comprises a lock device 3 including a lock member 30 (FIG. 3) attached or mounted or secured to the drive shaft 11 and the front plate 23, and rotated in concert with the drive shaft 11, for preventing the front plate 23 from being disengaged or separated from the drive shaft 11 inadvertently. It is preferable, but not necessary that the lock member 30 includes a stud or barrel or hub 31 extended therefrom for reinforcing purposes or the like, and includes a non-circular hole or bore 32, such as a hexagonal bore 32 formed therein and formed through the center portion of the lock member 30 and/or the hub 31 for engaging with the non-circular section 13 of the drive shaft 11 and for keying or anchoring or retaining or securing the lock member 30 to the drive shaft 11 (FIGS. 2, 6-7) and for preventing the lock member 30 from being pivoted or rotated relative to the drive shaft 11.

The lock device 3 further includes one or more (such as three) bolts or screws or fasteners 33 engaged with the lock member 30 and the front plate 23 (FIGS. 2, 6-7) for solidly and stably anchoring or retaining or securing the lock member 30 to the front plate 23 and for preventing the lock member 30 from being pivoted or rotated relative to the front plate 23 and also for preventing the lock member 30 from being disengaged or separated from the front plate 23 inadvertently. It is preferable that the lock member 30 includes one or more (such as three) oblong holes or grooves 34 formed therein (FIGS. 2-3 and 6-7) for slidably or adjustably receiving or engaging with the fasteners 33 respectively and for allowing the lock member 30 to be pivoted or rotated or adjusted relative to the front plate 23 before the fasteners 33 solidly and stably fasten or secure the lock member 30 to the front plate 23.

In operation, the pulley 21 may be engaged with a belt (not illustrated) for allowing the pulley 21 to be pivoted or rotated or driven by the belt selectively. When the coil or the stator 20 is not energized, or when the pressure plate or front plate 23 has not been actuated or operated and forced by the stator 20 to engage with the pulley 21, the front plate 23 and the drive shaft 11 will not be pivoted or rotated or driven by the pulley 21, and the pulley 21 may be pivoted or rotated freely relative to the housing 10 and the front plate 23 and the drive shaft 11 at this moment, On the contrary, when the stator 20 is energized and/or when the front plate 23 has been actuated or operated and forced by the stator 20 to engage with the pulley 21, the front plate 23 and the drive shaft 11 will be solidly and stably anchored or retained or secured to the pulley 21 and will be pivoted or rotated relative to the housing 10 together with the pulley 21.

It is to be noted that the engagement of the non-circular or hexagonal bore 32 of the lock member 30 with the corresponding non-circular section 13 of the drive shaft 11 allows the lock member 30 and thus the front plate 23 to be solidly and stably anchored or retained or secured to the drive shaft 11, and may prevent the lock member 30 and thus the front plate 23 from being pivoted or rotated relative to the drive shaft 11, and may prevent the front plate 23 from being disengaged or separated from the drive shaft 11 inadvertently.

Accordingly, the clutch device for compressor in accordance with the present invention includes an improved and simplified structure or configuration for suitably and solidly and stably anchoring or retaining or securing the front plate and the pulley to the compressor drive shaft and for preventing the front plate from being disengaged or separated from the pulley and the compressor drive shaft inadvertently.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A clutch device for a compressor, said compressor comprising:

a housing, a drive shaft rotatably engaged in said housing, a stator attached to said housing, a pulley rotatably attached to said housing and rotatable relative to said housing, a front plate attached to said drive shaft and rotated in concert with said drive shaft, and a lock device including a lock member attached to said drive shaft and rotated in concert with said drive shaft, and said lock member being secured to said front plate for anchoring and securing said front plate and said lock member and said drive shaft together, wherein said drive shaft includes a threaded section, and said front plate includes a screw hole formed in said front plate and engaged with said threaded section of said drive shaft for detachably attaching said front plate to said drive shaft.

2. A clutch device for a compressor, said compressor comprising:
  a housing,
  a drive shaft rotatably engaged in said housing,
  a stator attached to said housing,
  a pulley rotatably attached to said housing and rotatable relative to said housing,
  a front plate attached to said drive shaft and rotated in concert with said drive shaft, and
  a lock device including a lock member attached to said drive shaft and rotated in concert with said drive shaft, and said lock member being secured to said front plate for anchoring and securing said front plate and said lock member and said drive shaft together,
  wherein said drive shaft includes a non-circular section, and said lock member includes a non-circular bore formed in said lock member and engaged with said non-circular section of said drive shaft for anchoring said lock member to said drive shaft and for preventing said lock member from being rotated relative to said drive shaft.

3. The clutch device for said compressor as claimed in claim 2, wherein said non-circular bore of said lock member is selected from a hexagonal bore.

4. The clutch device for said compressor as claimed in claim 1, wherein said lock member includes a hub extended from said lock member for reinforcing said lock member.

5. The clutch device for said compressor as claimed in claim 1, wherein said lock device includes at least one fastener engaged with said lock member and said front plate for solidly member to said front plate and for preventing said lock member from being rotated relative to said front plate and for preventing said lock member from being disengaged from said front plate inadvertently.

6. A clutch device for a compressor, said compressor comprising:
  a housing,
  a drive shaft rotatably engaged in said housing,
  a stator attached to said housing,
  a pulley rotatably attached to said housing and rotatable relative to said housing,
  a front plate attached to said drive shaft and rotated in concert with said drive shaft, and
  a lock device including a lock member attached to said drive shaft and rotated in concert with said drive shaft, and said lock member being secured to said front plate for anchoring and securing said front plate and said lock member and said drive shaft together, said lock device including at least one fastener engaged with said lock member and said front plate for securing said lock member to said front plate and for preventing said lock member from being rotated relative to said front plate and for preventing said lock member from being disengaged from said front plate inadvertently,
  wherein said lock member includes at least one groove formed in said lock member for slidably and adjustably engaging with said at least one fastener and for allowing said lock member to be adjusted relative to said front plate before said at least one fastener secures said lock member to said front plate.

* * * * *